(12) United States Patent
Gellatly et al.

(10) Patent No.: US 9,165,412 B2
(45) Date of Patent: Oct. 20, 2015

(54) REMOTELY LOCATED DATABASE FOR MANAGING A VEHICLE FLEET

(75) Inventors: Andrew W. Gellatly, Macomb, MI (US); Matthew M. Highstrom, South Lyon, MI (US); Timothy J. Grost, Clarkston, MI (US)

(73) Assignee: GM Global Technology Operations LLC, Detroit, MI (US)

(*) Notice: Subject to any disclaimer, the term of this patent is extended or adjusted under 35 U.S.C. 154(b) by 599 days.

(21) Appl. No.: 13/267,091

(22) Filed: Oct. 6, 2011

(65) Prior Publication Data

US 2013/0090781 A1 Apr. 11, 2013

(51) Int. Cl.
*G07C 5/00* (2006.01)
*G06Q 10/08* (2012.01)
*B60R 25/25* (2013.01)

(52) U.S. Cl.
CPC ............... *G07C 5/008* (2013.01); *B60R 25/25* (2013.01); *G06Q 10/08* (2013.01)

(58) Field of Classification Search
CPC  B60R 25/1004; B60R 25/102; B60R 25/241; B60R 25/25; B60R 16/037; B60R 25/2018; B60R 25/2081; B60R 25/00; B60R 25/01; B60R 25/014; B60R 25/04; B60R 25/10; B60R 25/01; B60R 25/20; B60R 25/252–25/257; B60W 2540/28; B60W 2550/402; B60W 2540/00; B60W 2540/02–2540/06; G07C 9/00158; G07C 9/00087; G07C 9/00111; G07C 2009/00793; G07C 9/00134; G07C 9/00166; H04L 63/0861
See application file for complete search history.

(56) References Cited

U.S. PATENT DOCUMENTS

| | | | | |
|---|---|---|---|---|
| 6,232,874 B1* | 5/2001 | Murphy | ................... | 340/426.19 |
| 6,501,374 B1* | 12/2002 | King et al. | ................ | 340/457.1 |
| 6,701,231 B1* | 3/2004 | Borugian | ..................... | 701/29.2 |
| 6,728,616 B1* | 4/2004 | Tabe | ............................... | 701/45 |
| 6,810,309 B2* | 10/2004 | Sadler et al. | ...................... | 701/1 |
| 7,009,499 B2* | 3/2006 | Bernosky et al. | ......... | 340/426.1 |
| 7,535,344 B2* | 5/2009 | Obradovich | ............. | 340/426.33 |
| 8,044,782 B2* | 10/2011 | Saban | .......................... | 340/438 |
| 8,370,030 B1* | 2/2013 | Gurin | ............................. | 701/49 |
| 8,977,408 B1* | 3/2015 | Cazanas et al. | .................... | 701/2 |
| 2002/0197976 A1* | 12/2002 | Liu et al. | ...................... | 455/352 |
| 2004/0010358 A1* | 1/2004 | Oesterling et al. | ............. | 701/49 |

(Continued)

OTHER PUBLICATIONS

Chinese Second Office Action dated Apr. 14, 2015 for Chinese Patent Application No. 201210376065.7 with correspondence from Foreign Associate; 13 PGS.

*Primary Examiner* — Bao Long T Nguyen
(74) *Attorney, Agent, or Firm* — Cantor Colburn LLP

(57) ABSTRACT

A method and system of managing a vehicle fleet is provided. The method includes providing an electronic device, a computing device, and a vehicle that is associated with the vehicle fleet. The electronic device is located within a proximate distance from the vehicle and the computing device is located remotely from the vehicle. The electronic device is associated with a driver identifier. The method includes sending a data signal from the electronic device to the computing device indicating the driver identifier. The method further includes matching the driver identifier with a specific driver profile that is saved on a database of the computing device. The specific driver profile includes information associating the vehicle with the driver identifier. The method includes sending information regarding the specific driver profile from the database to a vehicle control module, where the vehicle control module associated with the vehicle.

15 Claims, 3 Drawing Sheets

(56) References Cited

U.S. PATENT DOCUMENTS

| | | | |
|---|---|---|---|
| 2004/0267410 A1* | 12/2004 | Duri et al. ........................ 701/1 |
| 2006/0026017 A1* | 2/2006 | Walker .............................. 705/1 |
| 2006/0122750 A1* | 6/2006 | Choi et al. ...................... 701/36 |
| 2007/0158128 A1 | 7/2007 | Gratz et al. |
| 2008/0065293 A1* | 3/2008 | Placke et al. ................... 701/41 |
| 2008/0140482 A1* | 6/2008 | Ehrman et al. ................... 705/7 |
| 2008/0255722 A1* | 10/2008 | McClellan et al. ............. 701/35 |
| 2009/0189755 A1* | 7/2009 | Pobuda et al. ................ 340/457 |
| 2010/0087987 A1* | 4/2010 | Huang et al. ................... 701/36 |
| 2010/0097178 A1* | 4/2010 | Pisz et al. ..................... 340/5.72 |
| 2010/0145700 A1* | 6/2010 | Kennewick et al. .......... 704/257 |
| 2010/0152976 A1* | 6/2010 | White et al. ................... 701/48 |
| 2010/0222939 A1* | 9/2010 | Namburu et al. ................. 701/2 |
| 2010/0280711 A1* | 11/2010 | Chen et al. ..................... 701/36 |
| 2011/0153118 A1* | 6/2011 | Lim et al. ......................... 701/2 |
| 2011/0153367 A1* | 6/2011 | Amigo et al. .................... 705/4 |
| 2012/0046982 A1* | 2/2012 | Wellman ...................... 705/7.12 |
| 2012/0053793 A1* | 3/2012 | Sala et al. ...................... 701/45 |
| 2013/0030645 A1* | 1/2013 | Divine et al. .................. 701/36 |

* cited by examiner

REMOTELY LOCATED DATABASE FOR MANAGING A VEHICLE FLEET

FIELD OF THE INVENTION

Exemplary embodiments of the invention relate to a vehicle fleet and, more particularly to a method and system of operating a vehicle fleet where a computing device having a database is located remotely from a vehicle.

BACKGROUND

Corporations that maintain a fleet of numerous vehicles are often faced with the challenging task of tracking and managing the fleet. In one example, the fleet may have test vehicles that are used for research and testing. Alternatively, the fleet may include work or service trucks as well.

Some of the challenges that a fleet operator or administrator may face include management of vehicle keys, the location of specific vehicles or operators, and the ability to limit functionality of in-vehicle systems based on an operator's driving history. Specifically, managing several sets of keys for a vehicle, or managing a single set of keys between multiple drivers may be time consuming and complicated. The fleet administrator may also need to have the resources to locate a specific vehicle or a driver. Moreover, a fleet administrator may need to be able to limit functionality based on the driving history. For example, a fleet administrator may need to limit certain in-vehicle functions for an inexperienced driver such as, for example, radio volume, or the ability to receive mobile telephone calls using a hands-free system.

The drivers who operate the fleet vehicles may also have issues as well. For example, every time a driver switches to another vehicle, certain user defined settings such as, for example, seat position, radio presets, and a list of contacts typically need to be modified. Accordingly, it is desirable to provide a fleet management system that tracks and manages fleet vehicles more efficiently when compared to the fleet management systems that are currently available.

SUMMARY OF THE INVENTION

In one exemplary embodiment of the invention, a method and system of managing a vehicle fleet is provided. The method includes providing an electronic device, a computing device, and a vehicle that is associated with the vehicle fleet. The electronic device is located within a proximate distance from the vehicle and the computing device is located remotely from the vehicle. The electronic device is associated with a driver identifier. The method includes sending a data signal from the electronic device to the computing device indicating the driver identifier. The method further includes matching the driver identifier with a specific driver profile that is saved on a database of the computing device. The specific driver profile includes information associating the vehicle with the driver identifier. The method includes sending information regarding the specific driver profile from the database to a vehicle control module, where the vehicle control module is associated with the vehicle. The method also includes selectively activating at least one vehicle system based on the specific driver profile. The at least one vehicle system is part of the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
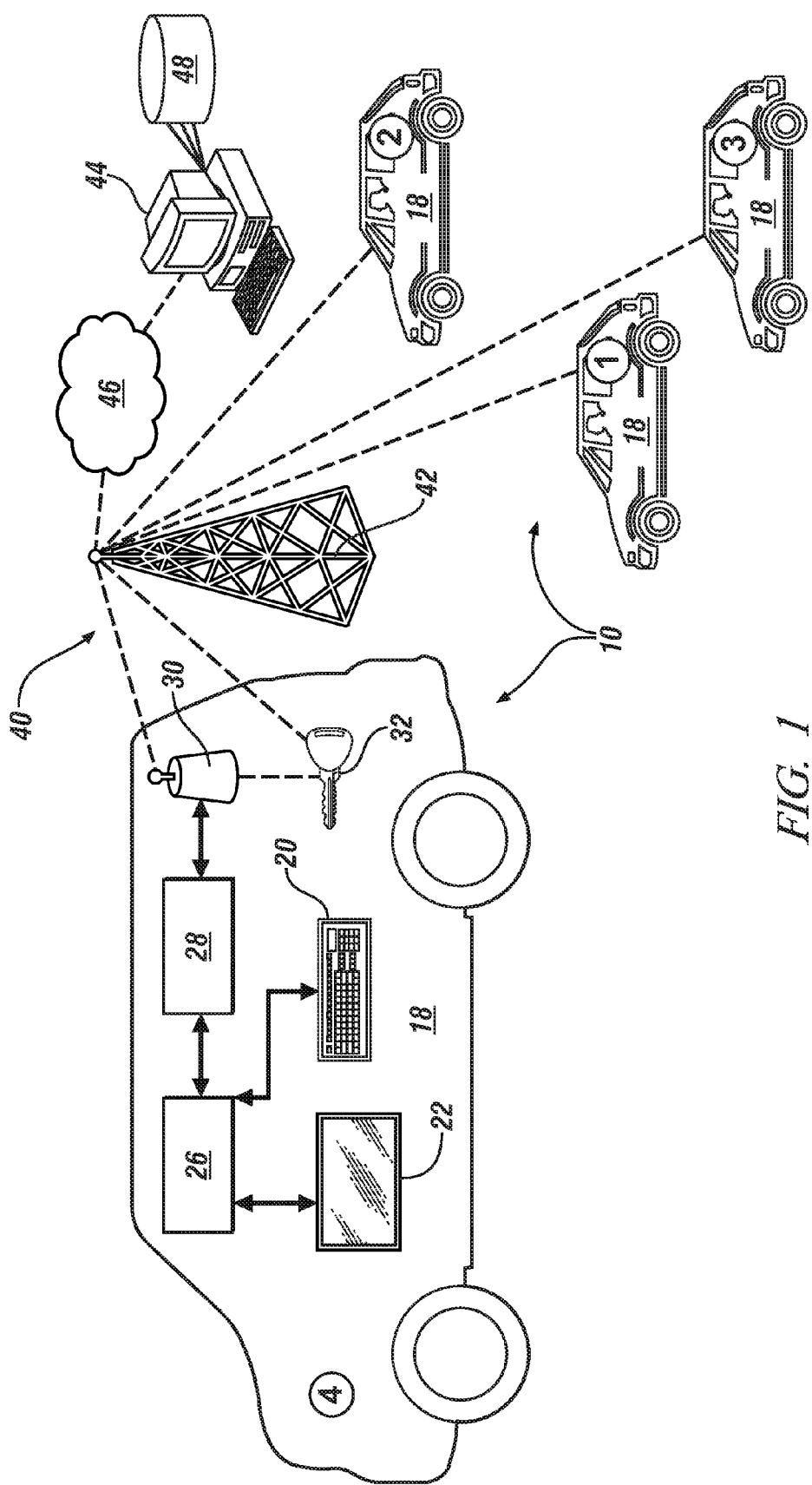
FIG. 1 is a schematic diagram of an exemplary vehicle fleet system that is employed in a specific vehicle.

Referring now to FIG. 1, an exemplary embodiment is directed to a vehicle fleet 10 having a plurality of vehicles 18 that are associated with the vehicle fleet 10. The vehicles 18 are typically motor vehicles such as, for example, automobiles or work trucks that are owned or leased by a corporation or government agency. For example, the vehicles 18 may be operated by a car rental company, a taxicab company, a public utility, a police department, or an automobile manufacturer. In one embodiment, the vehicles 18 may be employed to deliver goods or services to customers. In another embodiment, the vehicles 18 may be part of a vehicle evaluation fleet or a vehicle test fleet, where the vehicles 18 are used for research or testing purposes. As shown in FIG. 1, the vehicle fleet 10 illustrates four vehicles 18, which are labeled as '1', '2', '3', and '4'. The vehicles 18 may be operated by one or more authorized drivers.

FIG. 1 illustrates one of the plurality of vehicles 18 with an enlarged view to illustrate a user input 20, a display 22, at least one control module 26, a transceiver 28, an antenna 30, and an electronic device 32. The antenna 30 of the vehicle 18 is in communication with a wireless communication network 40 and the electronic device 32. For example, in the embodiment as shown, the network 40 is a cellular network that includes several cellular sites 42 where antennas and electronic communications equipment are placed. The network 40 also includes a remotely located computing device 44 that is in communication with the electronic device 32 and the antenna 30 over a network cloud 46. The computing device 44 includes a memory with a database 48 stored thereon. The computing device 44 is remotely located from each of the vehicles 18. Specifically, for example, the computing device 44 may be located at an office building (not shown) where a fleet administrator has access to the computing device 44 and the database 48.

The control module 26 is in communication with the user input 20, the display 22, the transceiver 28 and the antenna 30. The control module 26 receives data signals from the network 40 through the antenna 30 and the transceiver 28. Although FIG. 1 illustrates the transceiver 28 and the antenna 30 as separate components from the control module 26, it is to be understood that the transceiver 28 and the antenna 30 may also be integrated with the control module 26 as well. The user input 20 typically includes a keypad or a keyboard for allowing a user to input information. In one embodiment, the display 22 is a liquid crystal display ("LCD") screen, and is used to display graphics and text. Although FIG. 1 illustrates the user input 20 and the display 22 as separate components it is to be understood that the user input 20 and the display 22 may be a combined unit as well. For example, in another embodiment the display may be a touchscreen that detects the presence and location of a user's touch.

The control module 26 is in communication with the electronic device 32 through the transceiver 28 and the antenna 30 by a short-range wireless connection. The short range wireless connection is typically any type of wireless signal for exchanging data over relatively short distances such as, for example, a Bluetooth® signal conforming to IEEE Standard 802.15 or a Wi-Fi® signal conforming to IEEE standard 802.11. Alternatively, in another embodiment the control module 26 may be in communication with the electronic device 32 through a cable or data link connection as well.

The electronic device 32 may be a portable device that the driver typically carries on his or her person, or in a wallet or purse. In the exemplary embodiment as shown in FIG. 1, the electronic device 32 is an electronic master key device. The electronic device 32 may include a memory and a plurality of antennas (not shown) for wireless connectivity to the network 40 as well as the antenna 30 of the vehicle 18. In one embodiment, the memory of the electronic device 32 stores a driver identifier that is associated with a driver of the vehicle fleet 10. Specifically, the driver identifier is associated with one of the drivers of the vehicle fleet 10, where characteristics that identify a specific driver are stored on the memory of the electronic device 32. For example, in one embodiment the characteristics that identify a specific driver include, but are not limited to, a driver's name, a driver's employee identification number (i.e. the number 1234, etc.), or a driver's address. In another embodiment, the electronic device 32 may include a biometric device such as, for example, a fingerprint sensor, to identify a specific driver.

In one embodiment, the electronic device 32 may be used for activating an ignition switch (not shown in FIG. 1) of at least one of the vehicles 18 of the vehicle fleet 10. That is, the electronic device 32 is in communication with the network 40, where the electronic device 32 receives data signals indicating which specific vehicle 18 of the vehicle fleet 10 that the driver associated with the electronic device 32 is authorized to operate. For example, the driver associated with the master key may have access to only operate vehicles '1' and '4'. The master key would therefore only be able to activate an ignition switch of vehicles '1' and '4' and not vehicles '2' and '3'. However, although a master key is shown in FIG. 1, it is to be understood that the electronic device 32 may be any type of device for receiving data signals from the network 40 and activating the ignition of at least one of the vehicles 18. For example, in another embodiment, the electronic device 32 may be a personal electronic device such as a smartphone. The personal electronic device may include a memory for storing at least one end-user based application that activates the ignition switch of the vehicle 18. The electronic device 32 typically needs to be within a proximate distance of the vehicle 18 in order to activate the ignition switch. For example, in one embodiment, the proximate distance may be about thirty meters (which is about 100 feet), however it is understood that other distances may be used as well.

The control module 26 may be any type of vehicle control module that is associated for controlling at least one vehicle system or subsystem. For example, in one embodiment the control module 26 may be a keyless start control module for controlling an ignition switch (not shown in FIG. 1). In another embodiment, the control module 26 may be a radio control module having a memory for storing a user's radio presets. In yet another embodiment, the control module 26 may be an infotainment or navigational control module having a memory for storing the contents of a user's address book or telephone contact list. In still another embodiment, the control module 26 may also be an engine control module having control logic for limiting vehicle speed to a predefined limit. In another embodiment, the control module 26 is a hands-free control module that is in communication with a smartphone or mobile telephone for receiving telephone calls and transmitting an audio signal over an audio system (not shown) of the vehicle 18. The hands-free control module may also include control logic for receiving a text message and displaying the text on the display 22. In yet another embodiment, the control module 26 is a park assist control module. Moreover, although FIG. 1 illustrates only one control module 26, it is to be understood that multiple control modules may be included as well.

The database 48 stored on the remotely located computer 44 includes information regarding each of the vehicles 18 included in the vehicle fleet 10. The database 48 also includes information or driver data regarding at least one of the authorized drivers of the fleet, which is referred to as a specific driver profile. That is, the specific driver profile includes information associating one or more vehicles 18 with a particular driver. In one embodiment, the specific driver profile may allow a driver access (i.e. by activating an ignition switch) to at least one of the vehicles 18 of the vehicle fleet 10.

In another embodiment, the specific driver profile may include information regarding each of the driver's driving record and experience. For example, each of the drivers may have different levels of driving skill or experience. Thus, the database 48 may include information including an associated driving record for each specific driver profile, where drivers with only limited driving skills may need certain safety defined vehicle settings activated. Specifically, for example, in one embodiment, a driver with limited skill may need certain restrictions such as, for example, radio volume control, restricted or no ability to receive telephone calls and text messages over a hands-free system, or vehicle speed restrictions. In another embodiment, a driver with limited skill may not be able to disable certain safety related systems in the vehicle 18 such as, for example, park assist, a geo-fencing application or system, or a seatbelt reminder. A geo-fencing system is typically configured for limiting the vehicle 18 to a specified geographical region. That is, the vehicle 18 is operated in a virtually fenced-off geographical location, and an alert may be provided in the event the vehicle 18 leaves or ventures outside of the virtually fenced-off geographical location.

Each specific driver profile may also include information regarding a driver's settings in the vehicles 18. The driver's settings, which may also be referred to as driver presets, typically represent one or more vehicle settings that a driver adjusts in a vehicle. Specifically, for example, each driver may have a specific seat position setting that indicates the specific positions of a vehicle seat (not shown), or a specific group of radio station settings. The driver may also have a list of contacts or addresses that are typically stored in the memory of the control module 26, where the control module 26 may be associated with an infotainment or navigational system.

The electronic device 32 sends data signals to the computing device 44 through the network 40 indicating the driver identifier that is associated with the specific electronic device 32. For example, if John Doe is associated with the electronic device 32, then a data signal identifying the driver John Doe is sent through the network 40 and to the computing device 44. The computing device 44 includes control logic for matching the driver identifier sent through the network 40 with the corresponding specific driver profile stored in the database 48. For example, the computing device 44 would search the database 48 for the specific drive profile that is associated with John Doe. The computing device 44 then sends a data signal to the control module 26 through the network 40 including information regarding one of the authorized drivers of the fleet. Specifically, the data signal includes information regarding the specific driver profile that is associated with the specific electronic device 32. For example, the data signal would send back information indicating that John Doe is only authorized to operate the vehicle 18 denoted as number '4', and that John Doe is a driver with limited skill. Thus, because John Doe is a driver with limited skill, the specific driver profile would include certain restrictions such as radio volume control, vehicle speed control, and geo-fencing.

The control module 26 further includes control logic for selectively activating one or more vehicle systems based on the data signal received through the network 40. Specifically, for example, the vehicle 18 that is denoted as the number '4' would receive driver data activating the ignition of the vehicle 18, where one of the control modules 26 is an ignition switch control module. An engine control module would also receive driver data indicating that John Doe is a driver with limited skill, and would activate a vehicle speed limiter algorithm. Additionally, a radio control module would receive the driver data indicating John Doe is a driver with limited skill, and would activate an algorithm for limiting radio volume as well.

In one embodiment, the control module 26 may be a navigational control module that is in communication with a satellite (not shown). The navigational control module includes control logic for receiving the signal from the satellite and evaluating the signal to determining the current location of the vehicle 18. The navigational control module may send a data signal over the network 40 to the computing device 44 indicating the current location of the vehicle 18. Thus, a fleet administrator having access to the computing device 44 may be able to monitor the location of any of the vehicles 18. In one embodiment, a fleet administrator would be able to also track an associated driver with a specific vehicle 18. For example, if the vehicle 18 designated as '4' is tracked by a fleet administrator, the fleet administrator would also know that the driver John Doe is associated with vehicle '4'. Moreover, if the vehicle 18 designated as '4' includes associated equipment such as, for example, tools or testing equipment, the fleet administrator may also be able to monitor the location of the equipment as well.

When employing the vehicle fleet 10 as described above, a fleet administrator may no longer need to manage several sets of keys for a vehicle, or manage a single set of keys between multiple drivers, which may be time-consuming and complicated. Moreover, every time a driver switches from one vehicle 18 to another vehicle 18 (i.e., from the vehicle denotes as '3' to the vehicle denoted as '4'), the driver may no longer need to manually enter certain user defined settings such as, for example, seat position and radio presets.

Figure 2:
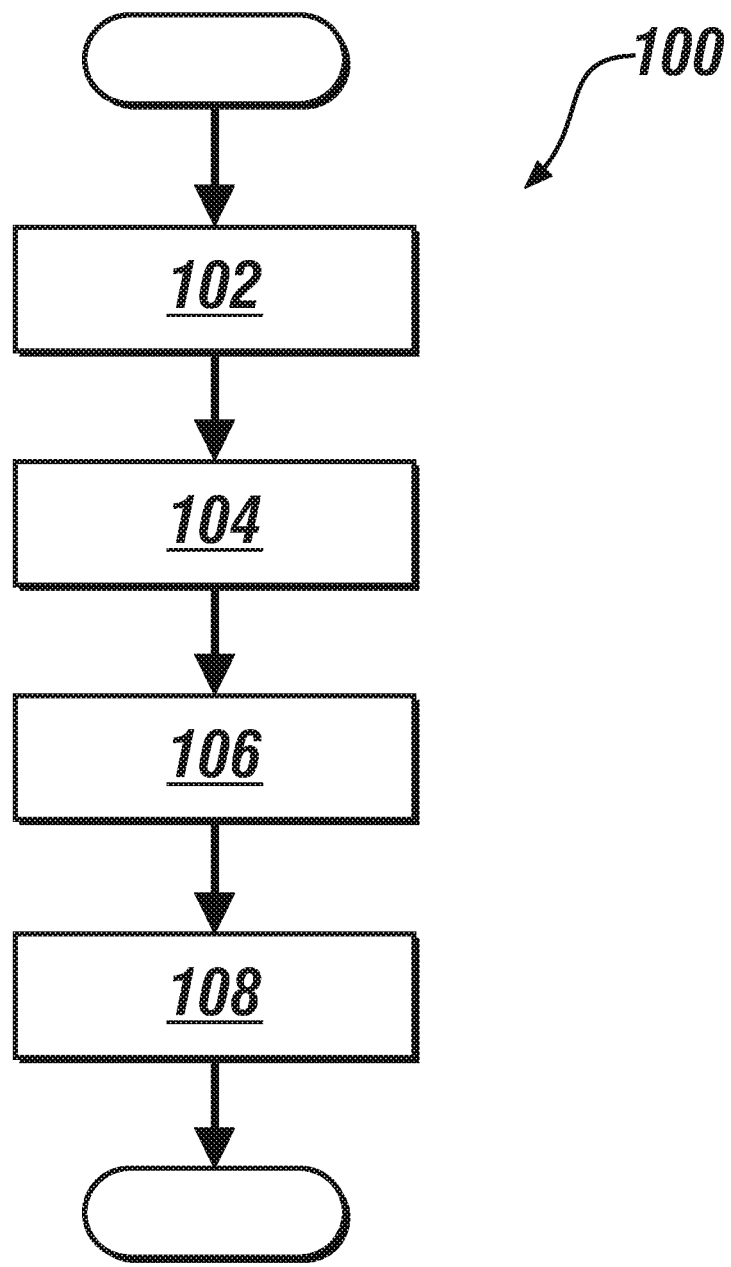
FIG. 2 is a process flow diagram illustrating a process for operating the vehicle fleet shown in FIG. 1.

A method of operating the vehicle fleet 10 will now be explained. Referring to FIG. 2, an exemplary process flow diagram illustrating an exemplary process of operating the vehicle fleet 10 is generally indicated by reference number 100. Process 100 begins at step 102, where an electronic device 32 sends data signals though a network 40 indicating a driver identifier that is associated with the specific electronic device 32. For example, if John Doe is associated with the electronic device 32, then a data signal indicating John Doe is sent through the network 40 and to a computing device 44. Process 100 may then proceed to step 104.

In step 104, the computing device 44 includes control logic for matching the driver identifier with a corresponding specific driver profile stored in the database 48. For example, the computing device 44 includes control logic for searching the database 48 for the specific driver profile associated with John Doe. Process 100 may then proceed to step 106.

In step 106, the computing device 44 sends a data signal to the control module 26 including information regarding the specific driver profile that is associated with the specific electronic device 32. For example, the data signal would send back information indicating that John Doe is only authorized to operate the vehicle 18 denoted as number '4', and that John Doe is a driver with limited skill. Process 100 may then proceed to step 108.

In step 108, the control module 26 includes control logic for selectively activating one or more vehicle systems based on the data signal received through the network 40. In the example as described above, the control module 26 would receive a data signal with driver data that is associated with the driver John Doe. Specifically, the vehicle 18 that is denoted as the number '4' would receive driver data that allows activating the ignition of the vehicle 18, where one of the control modules 26 is an ignition switch control module. Process 100 may then terminate.

Figure 3:
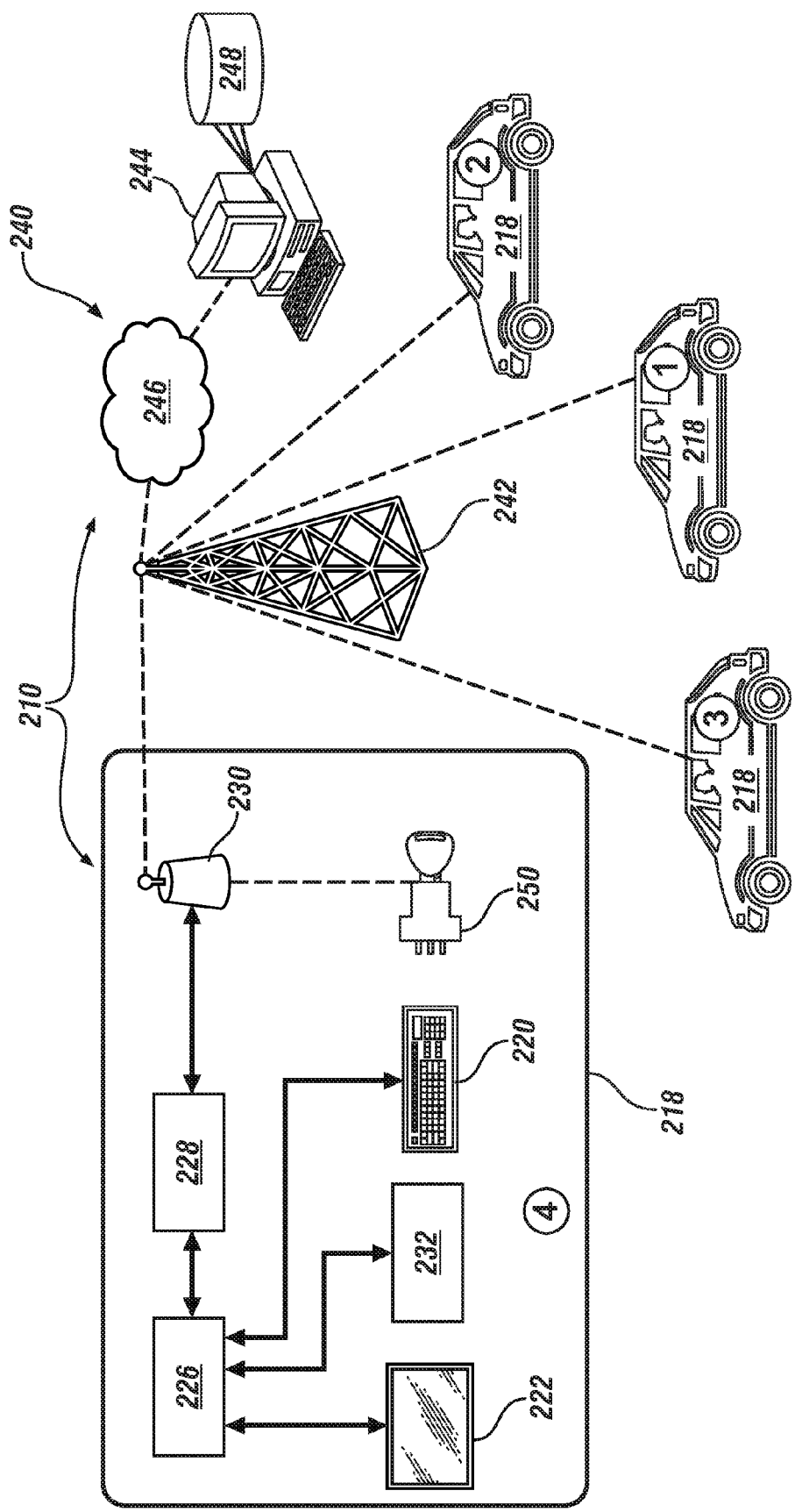
FIG. 3 is an alternative embodiment of the specific vehicle system shown in FIG. 1.

FIG. 3 is an alternative embodiment of a vehicle fleet 210 including a plurality of vehicles 218. In the embodiment as shown in FIG. 3, a biometrics device 232 is employed to identify a specific driver of the vehicle 218 instead of the electronic device 32 as shown in FIG. 1. The biometrics device 232 is any type of device that may detect the specific identity of a user. For example, the biometrics device 232 may detect the properties and characteristics of a driver's skin, a driver's fingerprint, a driver's voice, or a driver's iris. The control module 226 is in communication with the biometrics device 232, where the biometrics device 232 sends a data signal to the control module 226 indicating a driver identifier based on the properties and characteristics of a driver's skin, fingerprints, voice or iris.

The control module 226 is in communication with a network 240. The control module 226 sends information over the network 240 indicating the driver identifier that is obtained by the biometric device 232. For example, if the biometric device 232 determines that a driver is in fact an individual named John Doe, then a data signal indicating John Doe is sent through the network 240 to a computing device 244. The computing device 244 includes control logic for matching the driver identifier with a corresponding specific driver profile stored in a database 248. For example, similar to the embodiment as described above in FIG. 1, the computing device 244 would search the database 248 for the specific driver profile that is associated with John Doe.

The computing device 244 then sends a data signal to the control module 226 through the network 240 including information regarding one of the authorized drivers of the fleet. Specifically, the data signal includes information regarding the specific driver profile obtained from the biometrics device 232. For example, the data signal would send back information indicating that John Doe is only authorized to operate the vehicle 218 denoted as number '4', and that John Doe is a driver with limited skill. The control module 226 of the vehicle 218 may be in communication with other vehicle control modules (not shown) as well, such as an engine control module and a park assist control module.

The control module 226 includes control logic for selectively activating one or more vehicle systems based on the information received from the biometrics device 232. For example, in the embodiment as shown, the control module 226 is an ignition switch control module, and is in communication with an ignition switch 250. The control module 226 includes control logic for activating the ignition switch of the vehicle 218 in the event that the driver detected by the biometrics device 232 is John Doe. The control module 226 may also send data to other control modules (not shown) such as an engine control module indicating that John Doe is a driver with limited skill. The engine control module would then activate a vehicle speed limiter algorithm. Additionally, a radio control module would receive the driver data indicating John Doe is a driver with limited skill, and would activate an algorithm for limiting radio volume.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of managing vehicles in a vehicle fleet, comprising:
   providing an electronic device, a computing device, and a vehicle that is associated with the vehicle fleet, wherein the electronic device is located within a proximate distance from the vehicle and the computing device is located remotely from the vehicle, and wherein the electronic device is associated with a driver identifier;
   sending a data signal from the electronic device to the computing device indicating the driver identifier;
   matching the driver identifier with a specific driver profile that is saved on a database of the computing device, wherein the specific driver profile includes information associating the vehicle with the driver identifier and wherein the database includes a plurality of driver profiles that are each associated with a specific driver and one of the vehicles in the vehicle fleet;
   sending information regarding the specific driver profile from the database to a vehicle control module, the vehicle control module associated with the vehicle;
   selectively activating at least one vehicle system based on the specific driver profile, wherein the at least one vehicle system is part of the vehicle;
   activating driver settings based on information regarding the specific driver profile received from the database of the computing device, wherein the driver settings include a seat position, a set of radio presets, and a list of contacts; and
   activating safety defined vehicle presets based on information regarding the specific driver profile received from the database of the computing device, wherein the safety defined vehicle presets includes a radio volume control, a hands-free system restriction, a vehicle speed restriction, a park assist restriction, a seatbelt reminder restriction and a geo-fencing restriction.

2. The method as recited in claim 1, comprising activating a vehicle ignition switch of the vehicle based on the specific driver profile.

3. The method as recited in claim 1, comprising providing a navigational control module that is in communication with the computing device, wherein the navigational control module sends information to the computing device indicating a location of the vehicle.

4. The method as recited in claim 1, comprising providing one of a personal electronic device and a master key as the electronic device.

5. The method as recited in claim 1, wherein the specific driver profile includes information including an associated driving record.

6. The method as recited in claim 1, comprising providing a plurality of vehicles, wherein the specific driver profile gains access to a portion of the plurality of vehicles.

7. A vehicle fleet having a plurality of vehicles, the vehicle fleet comprising:
   an electronic device that is associated with a driver identifier, the electronic device located within a proximate distance from a vehicle;
   a computing device in communication with the electronic device, wherein the computing device includes a computing device memory with a database stored thereon, the database including a specific driver profile that includes information associating the vehicle with the driver identifier, the computing device including control logic for matching the specific driver profile with the driver identifier, wherein the database includes a plurality of driver profiles that are each associated with a specific driver and one of the vehicles in the vehicle fleet; and
   at least one control module in communication with the electronic device and the computing device, the electronic device located within a proximate distance of the vehicle, and the computing device located remotely from the vehicle, and wherein the control module is in communication with at least one vehicle system that is part of the vehicle, the at least one control module comprising a control logic for:
      receiving information from the computing device regarding the specific driver pro file;
      activating the at least one vehicle system based on information from the electronic device regarding the specific driver profile;
      activating driver settings based on information regarding the specific driver profile received from the database of the computing device, wherein the driver settings include a seat position, a set of radio presets, and a list of contacts; and
      activating safety defined vehicle presets based on information regarding the specific driver profile received from the database of the computing device, wherein the safety defined vehicle presets include a radio volume control, a hands-free system restriction, a vehicle speed restriction, a park assist restriction, a seatbelt reminder restriction and a geo-fencing restriction.

8. The vehicle fleet as recited in claim 7, wherein the at least one vehicle system is an ignition switch of the vehicle, and wherein the control module includes control logic for selectively activating the ignition switch based on the specific driver profile.

9. The vehicle fleet as recited in claim 7, wherein the at least one control module is a navigational control module that is in communication with the computing device, wherein the navigational control module sends information to the computing device indicating the location of the vehicle.

10. The vehicle fleet as recited in claim 7, wherein the specific driver profile includes information including an associated driving record.

11. The vehicle fleet as recited in claim 7, wherein the electronic device is one of a master key and a personal electronic device.

12. A vehicle fleet having a plurality of vehicles, the vehicle fleet comprising:
- a biometrics device configured for determining a driver identifier;
- a computing device including a computing device memory with a database stored thereon, the database including a specific driver profile that includes information associating a vehicle with the driver identifier, the computing device including control logic for matching the specific driver profile with the driver identifier and wherein the database includes a plurality of driver profiles that are each associated with a specific driver and one of the vehicles in the vehicle fleet; and
- at least one control module in communication with the biometric device and the computing device, the computing device located remotely from the vehicle, and wherein the control module is in communication with at least one vehicle system that is part of the vehicle, the at least one control module comprising a control logic for:
  monitoring the biometric device for the driver identifier;
  sending the driver identifier to the computing device;
  receiving information from the computing device regarding the specific driver pro file;
  activating the at least one vehicle system based on information from the biometric device;
  activating driver settings based on information regarding the specific driver profile received from the database of the computing device, wherein the driver settings include a seat position, a set of radio presets, and a list of contacts; and
  activating safety defined vehicle presets based on information regarding the specific driver profile received from the database of the computing device, wherein the safety defined vehicle presets include a radio volume control, a hands-free system restriction, a vehicle speed restriction, a park assist restriction, a seatbelt reminder restriction and a geo-fencing restriction.

13. The vehicle fleet as recited in claim 12, wherein the biometrics device is configured for detecting characteristics of one of skin, fingerprints, voice, and an iris.

14. The vehicle fleet as recited in claim 12, wherein the at least one vehicle system is an ignition switch of the vehicle, and wherein the control module includes control logic for selectively activating the ignition switch based on the specific driver pro file.

15. The vehicle fleet as recited in claim 12, wherein the specific driver profile includes information indicating an associated driving record.

* * * * *